United States Patent
Anderson et al.

(10) Patent No.: US 7,089,450 B2
(45) Date of Patent: Aug. 8, 2006

(54) APPARATUS AND METHOD FOR PROCESS RECOVERY IN AN EMBEDDED PROCESSOR SYSTEM

(75) Inventors: Gary D. Anderson, Austin, TX (US); Andreas Arnez, Schoenaich (DE); Joshua W. Boyer, Rochester, MN (US); Gerald G. Kreissig, Herrenberg (DE); Paul Edward Movall, Rochester, MN (US); Ward R. Nelson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/422,688

(22) Filed: Apr. 24, 2003

(65) Prior Publication Data
US 2004/0215997 A1    Oct. 28, 2004

(51) Int. Cl.
*G06F 11/00* (2006.01)
(52) U.S. Cl. .............. 714/15; 714/23; 714/51
(58) Field of Classification Search .......... 714/14, 714/23, 41
See application file for complete search history.

(56) References Cited

U.S. PATENT DOCUMENTS

| | | | | |
|---|---|---|---|---|
| 5,638,510 A | * | 6/1997 | Ishikawa | 714/51 |
| 5,748,882 A | * | 5/1998 | Huang | 714/47 |
| 5,923,833 A | * | 7/1999 | Freund et al. | 714/19 |
| 6,105,148 A | * | 8/2000 | Chung et al. | 714/16 |
| 6,269,478 B1 | * | 7/2001 | Lautenbach-Lampe et al. | 717/127 |
| 6,526,527 B1 | * | 2/2003 | Gall et al. | 714/55 |
| 6,928,585 B1 | * | 8/2005 | Bartley | 714/23 |
| 2003/0221141 A1 | * | 11/2003 | Wenisch | 714/47 |

* cited by examiner

*Primary Examiner*—Bryce P. Bonzo
*Assistant Examiner*—Jack W. Szeto
(74) *Attorney, Agent, or Firm*—Martin & Associates, LLC; Derek P. Martin (57) ABSTRACT

A recovery process for embedded processors monitors other processes in the system. Each process may specify a recovery policy residing in nonvolatile electronic memory that preferably includes a recovery count, a recovery time, and a recovery action. If a process terminates unexpectedly, the recovery process determines whether the process had a corresponding recovery policy. If not, the recovery process does not recover the process. If the process has a corresponding recovery policy, the recovery process determines whether it can recover the process by examining the recovery count and recovery time specified in the recovery policy. If the process can be recovered, the recovery process performs the recovery action specified in the corresponding recovery policy. If the process cannot be recovered, the recovery process resets the system. In this manner, a single process may be recovered by the recovery process without user intervention and without affecting other processes running on the system, and without performing a reset of the entire system.

19 Claims, 5 Drawing Sheets

APPARATUS AND METHOD FOR PROCESS RECOVERY IN AN EMBEDDED PROCESSOR SYSTEM

BACKGROUND OF THE INVENTION

1. Technical Field

This invention generally relates to data processing, and more specifically relates to recovery of software processes in an embedded processor system.

2. Background Art

Modern electronics provide many conveniences of life. Many modern appliances use embedded processors to perform control functions, display information to a user, etc. One example of an embedded processor is found in many electronic appliances, such as microwave ovens and clothes irons. Another common example of an embedded processor is found in many modern automobiles. Many commercially-available embedded processors include specialized functions. For example, one may include display drivers that allow the processor to directly drive seven segment light emitting diode (LED) displays, such as those found on some microwave ovens. Another may include on-chip analog-to-digital (A/D) and/or digital-to-analog (D/A) converters that allow the processor to be connected directly to external analog circuitry. Many specialized functions are available on-chip in known embedded processors.

Figure 2:
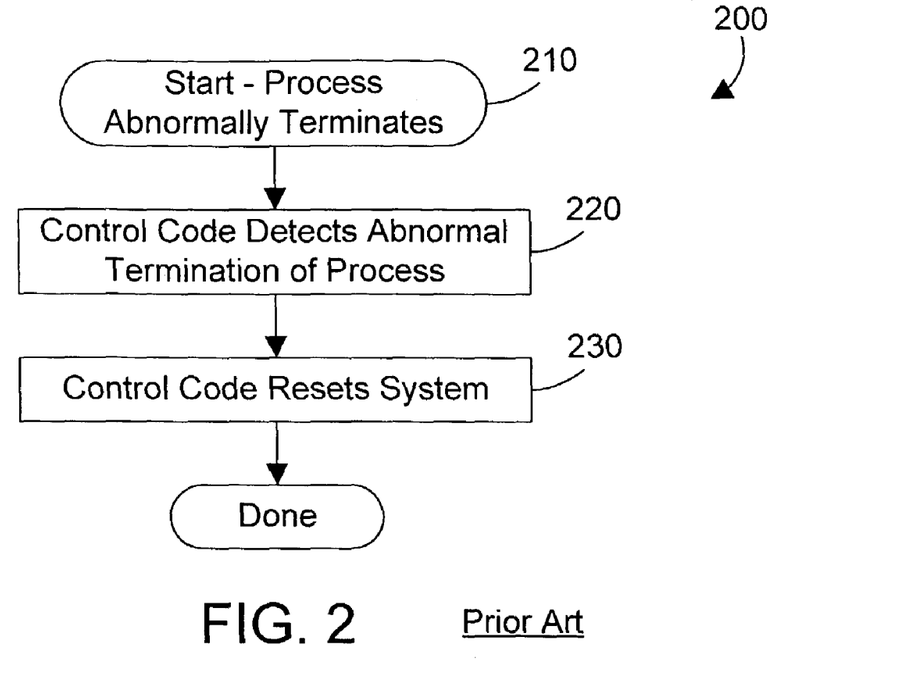
FIG. 2 is a flow diagram of a prior art method for resetting an embedded processor system when a process abnormally terminates.

One problem with an embedded processor system occurs when a software process terminates unexpectedly. Because there is no consistent user interface for embedded processor systems (such as a keyboard and display on a desktop computer system), there may not be any way for the processor to notify a user that the process has terminated, and even if notification is possible, there may be nothing the user can do about it. For this reason, it is desirable to provide intelligence within the embedded system to know how to handle the unexpected termination of a process. Referring to FIG. 2, a prior art method 200 for an embedded processor system begins when a process abnormally terminates (step 210). We assume that control code (such as an operating system kernel) monitors all processes, and detects when any process terminates abnormally (step 220). In response, the control code resets the system (step 230). One of the problems with prior art method 200 of FIG. 2 is that a single abnormal termination of a process results in resetting the entire embedded system. This may not be desirable if the process that abnormally terminated was a non-critical process, or if the abnormally terminated process could be restarted without affecting other processes that are running on the embedded system. Without a way to recover a process in a way that does not require user intervention and that does not force reset of the entire system, the embedded control industry will continue to suffer from inefficient mechanisms for handling the unexpected termination of a process.

DISCLOSURE OF INVENTION

A recovery process for embedded processors monitors other processes in the system. Each process may specify a recovery policy residing in nonvolatile electronic memory that preferably includes a recovery count, a recovery time, and a recovery action. If a process terminates unexpectedly, the recovery process determines whether the process had a corresponding recovery policy. If not, the recovery process does not recover the process. If the process has a corresponding recovery policy, the recovery process determines whether it can recover the process by examining the recovery count and recovery time specified in the recovery policy. If the process can be recovered, the recovery process performs the recovery action specified in the corresponding recovery policy. If the process cannot be recovered, the recovery process resets the system. In this manner, a single process may be recovered by the recovery process without user intervention and without affecting other processes running on the system, and without performing a reset of the entire system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a recovery process monitors all processes in a system, detects when any process terminates abnormally, and checks to see if the terminated process has a corresponding recovery policy in nonvolatile memory. If not, the recovery process does not recover the process. If so, the recovery process determines from the recovery policy whether the process may be recovered, and if it can, the recovery process recovers the process by performing one or more actions specified in the recovery policy. The preferred embodiments thus allow recovery of a single process without affecting other processes and without user intervention. Note that if the recovery process terminates abnormally, control code can detect this condition and perform a reset of the system.

Figure 1:
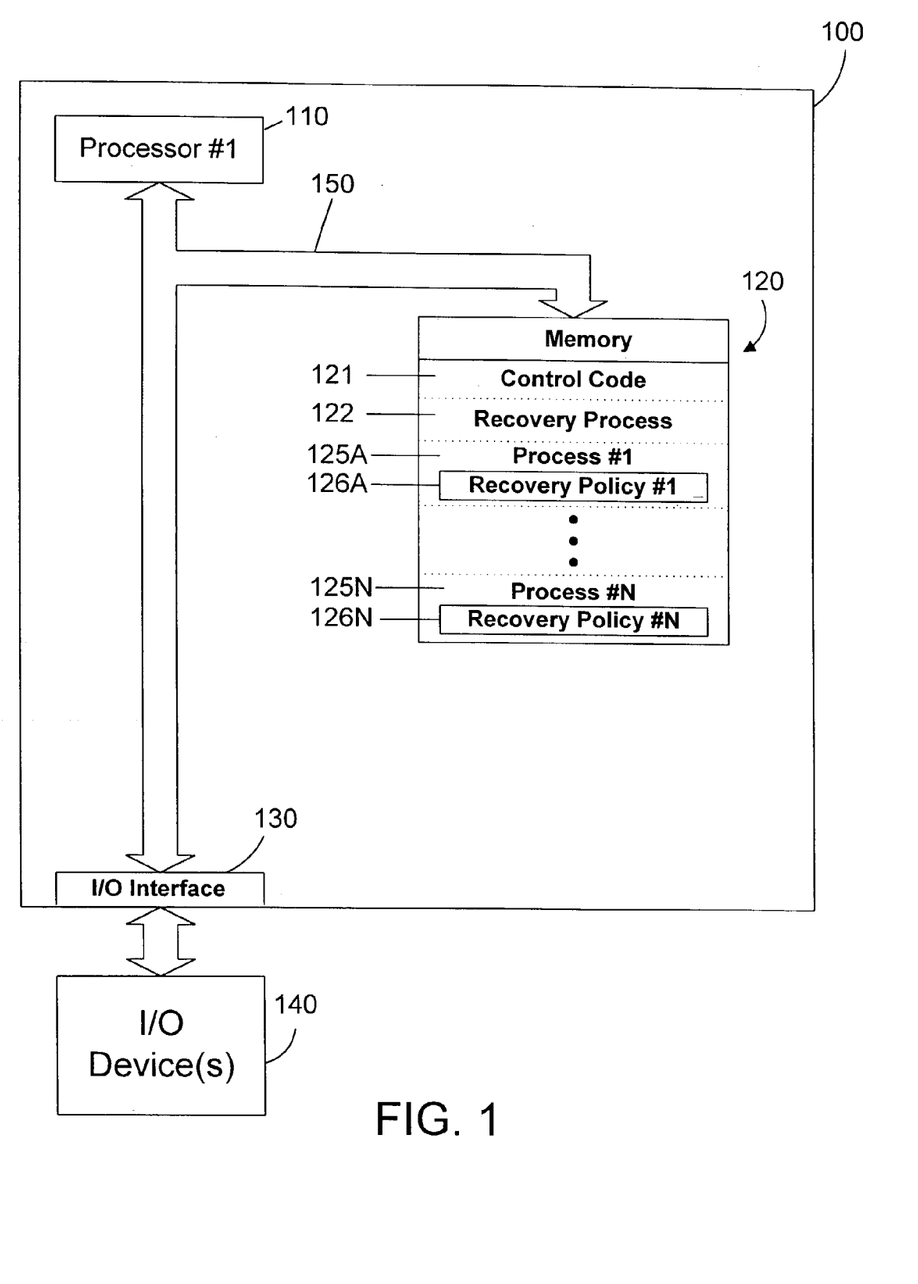
FIG. 1 is a block diagram of an embedded processor apparatus that supports automatic recovery of a process without user intervention in accordance with the preferred embodiments.

Referring to FIG. 1, an embedded control system 100 represents one suitable type of system that supports process recovery in accordance with the preferred embodiments. As shown in FIG. 1, embedded control system 100 comprises a processor 110 connected to a memory 120 and to an I/O interface 130 via a system bus 150.

Memory 120 contains control code 121, a recovery process 122, and one or more other processes 125, shown in FIG. 1 as processes 125A through 125N. Control code 121 is code that controls the function of embedded control system 100, and may include a commercially-available operating system or may simply be custom code that is written to cause embedded control system 100 to perform its intended function. Control code 121 manages the resources of embedded control system 100, such as the processor 110, memory 120, I/O interface 130, and system bus 150. In addition, control code 121 preferably monitors the recovery process 122, and if the recovery process 122 terminates abnormally, the control code 121 causes a system reset of embedded control system 100. The prior art method 200 for resetting a system may be used by control code 121 to monitor the recovery process 122 for abnormal termination. Note, however, that in the preferred embodiments, the rest of processes 125 in the system are managed by the recovery process 122. As a result, an abnormal termination of a process 125A will not necessarily cause a system reset as shown in method 200 of FIG. 2.

In the preferred embodiments, control code 121 creates the recovery process 122 and other processes 125, and preferably resides in nonvolatile electronic memory coupled to the processor 110. It is thus possible that memory 120 includes a volatile electronic memory (such as Random Access Memory) and a nonvolatile electronic memory (such as Read Only Memory). The recovery policies 126 reside in the nonvolatile memory, so they are programmed into the nonvolatile memory and cannot be changed by a user of the embedded control system. The recovery policies 126 may only be changed by a programmer that has access to control code 121. For this reason, the recovery policies 126 may only be changed in a programming environment, and may not be changed while the apparatus 100 is running.

Recovery process 122 is a special process created by the control code 121 that is used to monitor one or more other processes (e.g., 125 in FIG. 1). In the preferred embodiments, recovery process 122 monitors all processes 125 for abnormal termination. When a process 125 terminates abnormally, the recovery process 122 first determines whether the process has a corresponding recovery policy 126 (shown in FIG. 1 as 126A through 126N). If the process has no recovery policy, the recovery process 122 does nothing to recover the process. If the process has a corresponding recovery policy, the recovery process 122 may perform one or more actions dictated by the recovery policy to recover the process.

Processor 110 may be constructed from one or more microprocessors and/or integrated circuits. Processor 110 executes program instructions stored in memory 120. Memory 120 stores programs and data that processor 110 may access. When computer system 100 starts up, processor 110 initially executes the program instructions that make up the control code 121.

I/O interface 130 may include any suitable number and type of interfaces according to the specific application for embedded processor system 100. For example, I/O interface 130 may include an interface to an on-chip A/D converter or to an on-chip D/A converter. I/O interface 130 may include a display driver interface. I/O interface is shown in FIG. 130 as a single item, but it is understood by those skilled in the art that I/O interface 130 may contain any and all suitable interfaces for embedded control system 100, whether currently known or developed in the future.

Although embedded control system 100 is shown to contain only a single processor and a single system bus, those skilled in the art will appreciate that the present invention may be practiced in a system that has multiple processors and/or multiple buses. In addition, the I/O interface 130 used in the preferred embodiment may include separate, fully programmed microprocessors that are used to off-load compute-intensive processing from processor 110.

At this point, it is important to note that while the present invention has been and will continue to be described in the context of a fully functional embedded control system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD ROM, and transmission type media such as digital and analog communications links. The program product of the preferred embodiments may then be programmed into a nonvolatile memory in the embedded control system 100.

Figure 3:
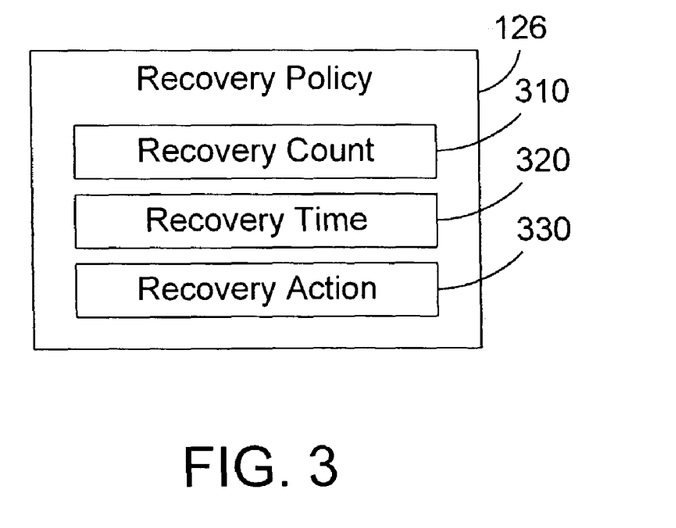
FIG. 3 is a block diagram of the recovery policy shown in FIG. 1 showing additional details in accordance with the preferred embodiments.

A preferred implementation for recovery policy 126 in FIG. 1 according to the preferred embodiments is shown in FIG. 3. A recovery policy 126 preferably specifies a recovery count 310, a recovery time 320, and a recovery action 330. Recovery count 310 is the maximum number of times the corresponding process may be recovered. Recovery time 320 allows specifying a time period. If recovery time 320 is zero, the recovery count 310 reflects the number of times the corresponding process can be recovered since the last system reset. If the recovery time 320 is greater than zero, the recovery count 310 reflects the number of times the corresponding process has been recovered within a time period defined by recovery time 320. Recovery action 330 specifies one or more actions to perform to recover the corresponding process. In the most common case, the recovery action 330 specifies to restart the corresponding process. However, the recovery action 330 may include any suitable number and type of functions. For example, if the corresponding process depends on a different process, the recovery action 330 for each process could specify that both processes be restarted. In another example, the recovery action 330 could include the logging of an error message or error information, followed by restarting the process.

Figure 4:
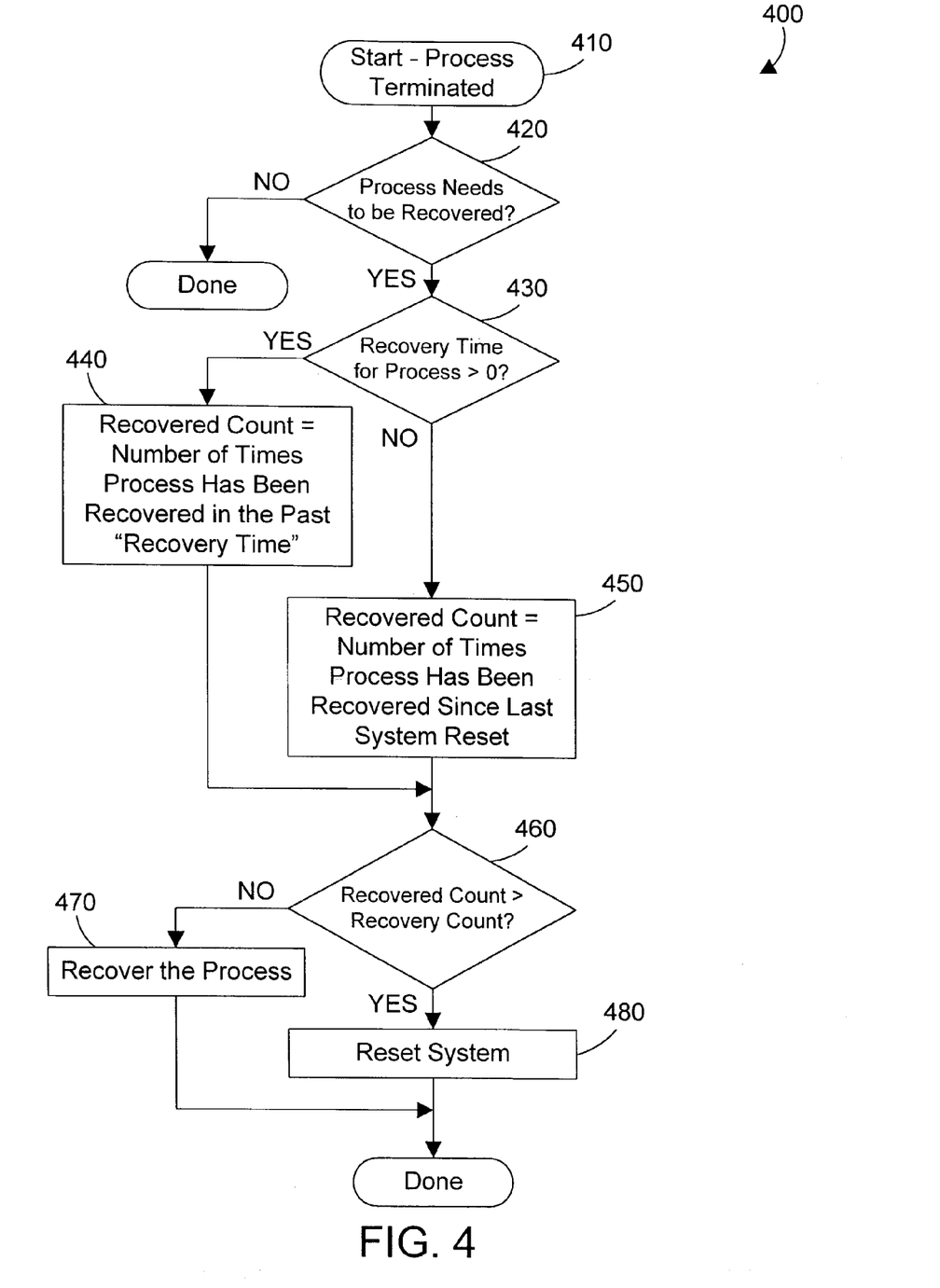
FIG. 4 is a flow diagram of a method in accordance with the preferred embodiments for recovering a process when the process abnormally terminates.

In the preferred embodiments, recovery process 122 preferably performs the steps in method 400 shown in FIG. 4. Method 400 begins when a process is terminated (step 410). First, step 420 determines whether the process needs to be recovered (step 420). If not (step 420=NO), no action is required by the recovery process, so method 400 is done. If the process needs to be recovered (step 420=YES), the recovery time in the corresponding recovery policy is read. If the recovery time is greater than zero (step 430=YES), a value we'll call "recovered count" represents the number of times the process has been recovered in the past period defined by the recovery time (step 440). If the recovery time for the process is not greater than zero (step 430=NO), the recovered count is the number of times the process has been recovered since the last system reset (step 450). The recovered count is then compared to the recovery count 310 specified in the recovery policy for the corresponding process (step 460). If the recovered count is not greater than the recovery count (step 460=NO), the process is recovered (step 470). If the recovered count is greater than the recovery count (step 460=YES), the system is reset (step 480). Note that the action taken during step 470 is specified in the recovery action 330 in the corresponding recovery policy 126.

A system reset in step 480 may be any suitable reset of the embedded processor system. In the most preferred implementation, the system reset is a software reset that causes the processor to begin executing the control code 121 anew. However, step 480 could also cause a hardware reset if an output line of the embedded control processor were connected to the input of a monostable multivibrator (one-shot), which has an output that drives a hardware reset signal. Step 480 expressly includes any and all hardware and software methods for resetting the embedded processor system.

Figure 5:
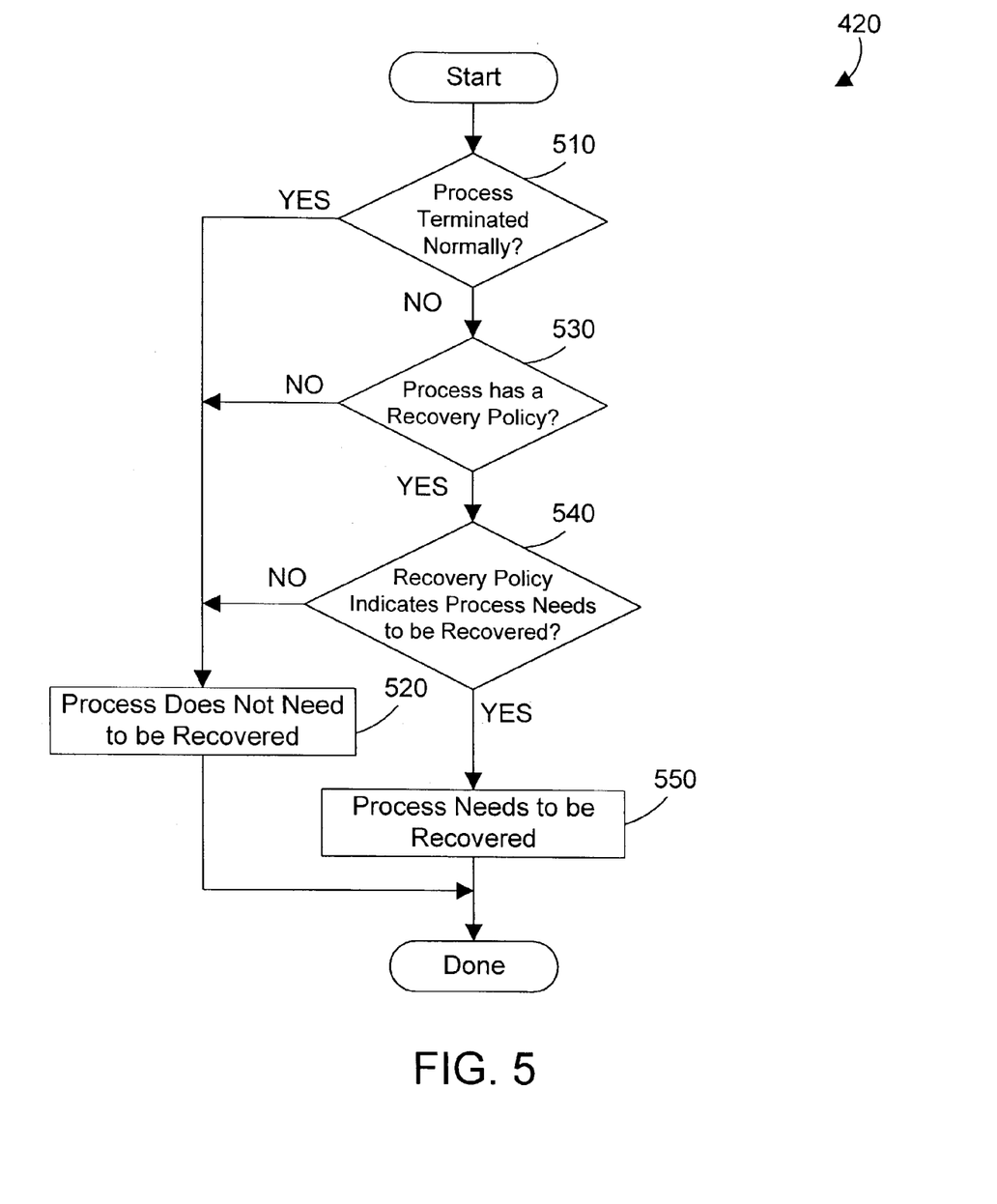
FIG. 5 is a flow diagram of a method in accordance with the preferred embodiments showing one suitable implementation for step 420 of FIG. 4.

The flow diagram of FIG. 5 shows one suitable implementation for step 420 in FIG. 4 in accordance with the preferred embodiments, which determines whether or not a process needs to be recovered. If the process terminated normally (step 510=YES), the process does not need to be recovered (step 520). If the process does not terminate normally (step 510=NO), recovery of the process may be needed. If the process does not have a recovery policy (step 530=NO), the process does not need to be recovered (step 520). If the process has a corresponding recovery policy (step 530=YES), the recovery process determines from the recovery policy whether the process needs to be recovered (step 540). If not (step 540=NO), the process does not need to be recovered (step 520). If the recovery policy indicates that the process needs to be recovered (step 540=YES), the process needs to be recovered (step 550).

It may seem that the presence of a recovery policy would indicate that the corresponding process needs to be recovered, which means that the answer to step 540 should always be YES. However, the recovery policy may include conditions or tests that determine whether recovery is appropriate based on conditions that exist when the process is abnormally terminated. For example, the recovery policy could include a specification of abnormal terminations that are acceptable, and should not trigger recovery of the process. In this example, if a process were killed by a particular process that has authority to kill the process, the recovery policy could specify that the process not be recovered if it was killed by this particular process.

Figure 6:
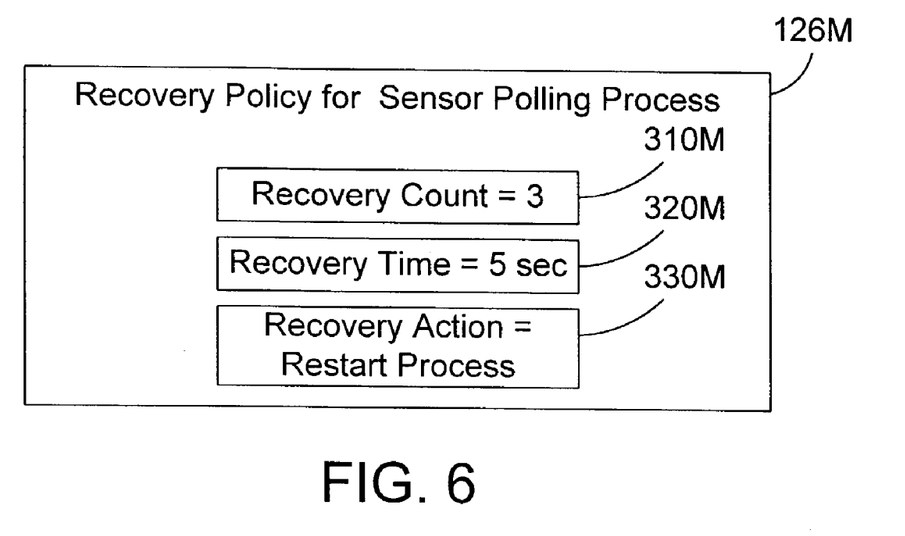
FIG. 6 is a block diagram of a sample recovery policy for a sample process.

A sample recovery policy 126M in accordance with the preferred embodiments is shown in FIG. 6. We assume that the embedded control system 100 is an automotive control system. One of the functions of an embedded control system used for automotive control is to read engine sensors the indicate the performance of the engine. We assume for this specific example that the engine sensors are read by a sensor polling process. We thus assume that the recovery policy 126M shown in FIG. 6 is the recovery policy corresponding to the sensor polling process. In this specific example, the recovery count 310M is set to a value of three, the recovery time 320M is set to a value of 5 seconds, and the recovery action 330M specifies that the corresponding process be restarted. If the sensor polling process should terminate abnormally, the recovery process will read the recovery policy 126M corresponding to the sensor polling process, and will determine whether the sensor polling process has been recovered three times in the last five seconds. If not, the process is recovered by restarting the process (as specified in the recovery action 330). If the sensor process has already been recovered three times in the last five seconds, the system is reset.

The preferred embodiments provide a way to selectively and individually recover processes in an embedded processor system. If a process needs to be recovered without affecting other processes, a corresponding recovery policy may be created and programmed into nonvolatile memory in the embedded processor system that specifies time and frequency parameters and that specifies one or more actions to take to recover the process. If the time or frequency parameters in the recovery policy are not met, the embedded processor system may be reset. In addition, if the recovery process itself terminates abnormally, the embedded processor system may be reset. The preferred embodiments thus provide an effective way to recover processes without user intervention and without affecting other processes in an embedded processor system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
an embedded control processor;
a memory coupled to the embedded control processor;
a recovery process residing in the memory and executed by the embedded control processor, the recovery process monitoring a plurality of processes residing in the memory and executed by the embedded control processor, at least one of the plurality of processes having a corresponding recovery policy that specifies whether the corresponding process may be recovered by the recovery process without affecting other of the plurality of processes, wherein the recovery policy comprises a recovery count, a recovery time, and a recovery action, wherein the recovery process recovers the corresponding process if the corresponding recovery policy specifies that the corresponding process may be recovered, the recovery process performing the steps of:
reading the recovery count;
reading the recovery time;
if the recovery time is zero, determining whether the corresponding process has been recovered a number of times less than the recovery count since the last reset, and if so, the recovery process recovers the corresponding process;
if the recovery time is greater than zero, determining whether the corresponding process has been recovered a number of times less than the recovery count in the time period specified by the recovery time, and if so, the recovery process recovers the corresponding process;
if the recovery time is zero and if the corresponding process has been recovered the number of times specified in the recovery count since the last reset, resetting the apparatus; and
if the recovery time is greater than zero and if the corresponding process has been recovered the number of times specified in the recovery count in the time period specified by the recovery time, resetting the apparatus.

2. The apparatus of claim 1 wherein the corresponding recovery policy resides in a nonvolatile electronic memory coupled to the embedded control processor.

3. The apparatus of claim 1 wherein the recovery process monitors the plurality of processes for abnormal termination.

4. The apparatus of claim 1 wherein the recovery process recovers the corresponding process without user intervention if the corresponding recovery policy specifies that the corresponding process may be recovered by the recovery process.

5. The apparatus of claim 1 further comprising a mechanism that monitors the recovery process for abnormal termination and that resets the apparatus if the recovery process terminates abnormally.

6. An apparatus comprising:
an embedded control processor;

a nonvolatile electronic memory coupled to the embedded control processor;

a plurality of processes executed by the embedded control processor;

a recovery process executed by the embedded control processor, the recovery process monitoring the plurality of processes for abnormal termination, at least one of the plurality of processes having a corresponding recovery policy residing in the nonvolatile electronic memory that specifies whether the corresponding process may be recovered, the recovery policy comprising a recovery count, a recovery time, and a recovery action, wherein the recovery process recovers the corresponding process without user intervention and without affecting other of the plurality of processes if the corresponding recovery policy specifies that the corresponding process may be recovered, the recovery process performing the steps of:

reading the recovery count;

reading the recovery time;

if the recovery time is zero, determining whether the corresponding process has been recovered a number of times less than the recovery count since the last reset, and if so, the recovery process recovers the corresponding process;

if the recovery time is greater than zero, determining whether the corresponding process has been recovered a number of times less than the recovery count in the time period specified by the recovery time, and if so, the recovery process recovers the corresponding process;

if the recovery time is zero and if the corresponding process has been recovered the number of times specified in the recovery count since the last reset, resetting the apparatus; and if the recovery time is greater than zero and if the corresponding process has been recovered the number of times specified in the recovery count in the time period specified by the recovery time, resetting the apparatus.

7. A computer-implemented method for recovering at least one of a plurality of processes executed by an embedded control processor, the method comprising the steps of:

monitoring the plurality of processes;

if one of the plurality of processes terminates abnormally, and if the one process has a corresponding recovery policy, determining from the corresponding recovery policy whether the one process may be recovered without affecting other of the plurality of processes, wherein the recovery policy comprises a recovery count, a recovery time, and a recovery action;

reading the recovery count;

reading the recovery time;

if the recovery time is zero, determining whether the corresponding process has been recovered a number of times less than the recovery count since the last reset of the system that includes the embedded control processor, and if so, the recovery process recovers the corresponding process;

if the recovery time is greater than zero, determining whether the corresponding process has been recovered a number of times less than the recovery count in the time period specified by the recovery time, and if so, the recovery process recovers the corresponding process;

if the recovery time is zero and if the corresponding process has been recovered the number of times specified in the recovery count since the last system reset, resetting the system; and if the recovery time is greater than zero and if the corresponding process has been recovered the number of times specified in the recovery count in the time period specified by the recovery time resetting the system.

8. The method of claim 7 further comprising the step of reading the corresponding recovery policy from a nonvolatile electronic memory.

9. The method of claim 7 further comprising the step of recovering the one process without user intervention if the corresponding recovery policy specifies that the one process may be recovered.

10. The method of claim 7 further comprising the steps of:

monitoring the recovery process for abnormal termination; and resetting the system that includes the embedded control processor if the recovery process terminates abnormally.

11. A computer-implemented method for recovering at least one of a plurality of processes executed by an embedded control processor, the method comprising the steps of:

monitoring the plurality of processes for abnormal termination;

when one of the plurality of processes terminates abnormally, determining whether the process has a corresponding recovery policy in nonvolatile electronic memory that specifies whether the corresponding process may be recovered, the recovery policy comprising a recovery count, a recovery time, and a recovery action;

if the recovery policy specifies that the process may be recovered, performing the steps of:

reading the recovery count;

reading the recovery time;

if the recovery time is zero, determining whether the corresponding process has been recovered a number of times less than the recovery count since the last reset of the system that includes the embedded control processor, and if so, the recovery process recovers the corresponding process;

if the recovery time is greater than zero, determining whether the corresponding process has been recovered a number of times less than the recovery count in the time period specified by the recovery time, and if so, the recovery process recovers the corresponding process;

if the recovery time is zero and if the corresponding process has been recovered the number of times specified in the recovery count since the last system reset, resetting the system; and if the recovery time is greater than zero and if the corresponding process has been recovered the number of times specified in the recovery count in the time period specified by the recovery time, resetting the system.

12. A program product comprising:

(A) a process recovery mechanism that monitors a plurality of processes executed by an embedded control processor in a system;

(B) a recovery policy corresponding to one of the plurality of processes, the recovery policy specifying whether the corresponding process may be recovered by the process recovery mechanism without affecting other of the plurality of processes, wherein the recovery policy comprises a recovery count, a recovery time, and a recovery action, wherein the process recovery mechanism recovers the corresponding process if the corresponding recovery policy specifies that the corresponding process may be recovered, the process recovery mechanism performing the steps of:

reading the recovery count;

reading the recovery time;

if the recovery time is zero, determining whether the corresponding process has been recovered a number of times less than the recovery count since the last system reset, and if so, the process recovery mechanism recovers the corresponding process;

if the recovery time is greater than zero, determining whether the corresponding process has been recovered a number of times less than the recovery count in the time period specified by the recovery time, and if so, the process recovery mechanism recovers the corresponding process;

if the recovery time is zero and if the corresponding process has been recovered the number of times specified in the recovery count since the last system reset, resetting the system; and if the recovery time is greater than zero and if the corresponding process has been recovered the number of times specified in the recovery count in the time period specified by the recovery time, resetting the system; and (C) computer readable signal bearing media bearing the process recovery mechanism and the recovery policy.

13. The program product of claim 12 wherein the signal bearing media comprises recordable media.

14. The program product of claim 12 wherein the signal bearing media comprises transmission media.

15. The program product of claim 12 wherein the process recovery mechanism monitors the plurality of processes for abnormal termination.

16. The program product of claim 12 wherein the process recovery mechanism recovers the corresponding process without user intervention if the corresponding recovery policy specifies that the corresponding process may be recovered by the process recovery mechanism.

17. A program product comprising:

(A) a process recovery mechanism that monitors for abnormal termination a plurality of processes executed by at least one embedded control processor in a system, at least one of the plurality of processes having a corresponding recovery policy stored in nonvolatile electronic memory that specifies whether the corresponding process may be recovered, the recovery policy comprising a recovery count, a recovery time, and a recovery action, wherein the process recovery mechanism recovers the corresponding process without user intervention and without affecting other of the plurality of processes if the corresponding recovery policy specifies that the corresponding process may be recovered, the process recovery mechanism performing the steps of:

reading the recovery count;

reading the recovery time;

if the recovery time is zero, determining whether the corresponding process has been recovered a number of times less than the recovery count since the last reset, and if so, the process recovery mechanism recovers the corresponding process;

if the recovery time is greater than zero, determining whether the corresponding process has been recovered a number of times less than the recovery count in the time period specified by the recovery time, and if so, the process recovery mechanism recovers the corresponding process;

if the recovery time is zero and if the corresponding process has been recovered the number of times specified in the recovery count since the last reset, resetting the apparatus; and if the recovery time is greater than zero and if the corresponding process has been recovered the number of times specified in the recovery count in the time period specified by the recovery time, resetting the apparatus; and (B) computer readable signal bearing media bearing the process recovery mechanism.

18. The program product of claim 17 wherein the signal bearing media comprises recordable media.

19. The program product of claim 17 wherein the signal bearing media comprises transmission media.

* * * * *